US009549621B2

(12) United States Patent
Neveling

(10) Patent No.: US 9,549,621 B2
(45) Date of Patent: Jan. 24, 2017

(54) CRIB MOUNTABLE NOISE SUPPRESSOR

(71) Applicant: Roseline Michael Neveling, New York, NY (US)

(72) Inventor: Roseline Michael Neveling, New York, NY (US)

( * ) Notice: Subject to any disclaimer, the term of this patent is extended or adjusted under 35 U.S.C. 154(b) by 0 days.

(21) Appl. No.: 14/739,479

(22) Filed: Jun. 15, 2015

(65) Prior Publication Data

US 2016/0360899 A1 Dec. 15, 2016

(51) Int. Cl.

| | |
|---|---|
| ***A47D 15/00*** | (2006.01) |
| ***H04R 29/00*** | (2006.01) |
| ***H04R 1/02*** | (2006.01) |
| ***G08B 21/02*** | (2006.01) |
| ***G10K 11/16*** | (2006.01) |
| ***G11B 20/10*** | (2006.01) |

(52) U.S. Cl.

CPC ........... *A47D 15/00* (2013.01); *G08B 21/0208* (2013.01); *G08B 21/0236* (2013.01); *G10K 11/16* (2013.01); *G11B 20/10* (2013.01); *H04R 1/026* (2013.01); *H04R 29/001* (2013.01)

(58) Field of Classification Search

CPC ................................ H04N 5/232; A47D 15/00

USPC ... 5/93.1, 99.1, 655; 340/3.1, 539.15, 573.1; 348/77; 381/56, 93, 94.3, 354; 434/169; 446/227; 455/39, 296; 600/22, 301, 479; 601/60

See application file for complete search history.

(56) References Cited

U.S. PATENT DOCUMENTS

| | | | | | |
|---|---|---|---|---|---|
| 4,785,797 | A * | 11/1988 | Cuervo | A47C 9/022 | 5/109 |
| 5,081,722 | A * | 1/1992 | Yu | A47D 9/02 | 5/109 |
| 5,446,934 | A * | 9/1995 | Frazier | A61G 11/00 | 5/421 |
| 5,991,131 | A * | 11/1999 | Othman | G11B 33/025 | 360/137 |
| 5,991,943 | A * | 11/1999 | Morris | A47C 15/002 | 135/90 |
| 6,011,477 | A * | 1/2000 | Teodorescu | A61B 5/113 | 340/573.1 |
| 6,409,654 | B1 * | 6/2002 | McClain | A61G 11/00 | 5/655 |
| 6,812,822 | B1 * | 11/2004 | Spector | G09F 13/12 | 340/3.1 |
| 7,017,204 | B1 * | 3/2006 | Fertil | A47C 17/32 | 5/513 |
| 7,729,680 | B2 * | 6/2010 | Gozen | H04B 1/1027 | 455/226.1 |

(Continued)

*Primary Examiner* — Gerald Gauthier
(74) *Attorney, Agent, or Firm* — Leason Ellis LLP

(57) ABSTRACT

A noise suppressor for use with a crib includes a frame that is configured for being detachably coupled to a frame of the crib. The frame of the noise suppressor is configured to extend across an open top of the crib. The noise suppressor includes a noise suppressor structure that is coupled to the frame of the noise suppressor. The noise suppressor structure is configured to at least substantially extend across the open top of the crib and is formed of a noise suppressing material. The noise suppressor further includes electronics disposed along one of the frame of the noise suppressor and the noise suppressor structure. The electronics include a speaker, a timer, and a first sensor for sensing sound within the crib above a predetermined threshold. In one variation, the electronics is configured to play a recording when either a predetermined amount of time has lapsed or the sound above the predetermined threshold is observed.

22 Claims, 6 Drawing Sheets

(56) References Cited

U.S. PATENT DOCUMENTS

| | | | | |
|---|---|---|---|---|
| 7,844,068 | B1 * | 11/2010 | Carver | H04R 1/2873 267/136 |
| 2002/0126855 | A1 * | 9/2002 | Terada | H04M 9/082 381/93 |
| 2003/0169892 | A1 * | 9/2003 | Ura | H04R 3/02 381/93 |
| 2004/0130449 | A1 * | 7/2004 | Hung | A61M 21/00 340/573.1 |
| 2008/0020672 | A1 * | 1/2008 | Osborn | A63H 33/006 446/227 |
| 2008/0192956 | A1 * | 8/2008 | Kazama | G10L 21/0208 381/94.3 |
| 2009/0070929 | A1 * | 3/2009 | Holman | A47D 7/03 5/93.1 |
| 2010/0159426 | A1 * | 6/2010 | Thieberger Ben-Haim | G09B 5/04 434/169 |
| 2011/0258776 | A1 * | 10/2011 | Schwartz | A47D 7/02 5/100 |
| 2012/0083670 | A1 * | 4/2012 | Rotondo | A61B 5/1116 600/301 |
| 2014/0055263 | A1 * | 2/2014 | Witt | A61B 5/0002 340/539.15 |
| 2014/0121540 | A1 * | 5/2014 | Raskin | A61B 5/6898 600/479 |
| 2015/0038072 | A1 * | 2/2015 | Cordier | A47D 15/00 455/39 |
| 2015/0288877 | A1 * | 10/2015 | Glazer | H04N 7/183 348/77 |
| 2015/0302721 | A1 * | 10/2015 | Schmidt | G08B 21/0461 5/93.1 |

* cited by examiner

CRIB MOUNTABLE NOISE SUPPRESSOR

TECHNICAL FIELD

The present invention is directed to cribs, playpens and other similar enclosures for infants and children and more particularly, to a crib mountable noise suppressor that can be used as a part of an infant sleep training program.

BACKGROUND

One of the many challenges that face new parents is getting sufficient sleep and in particular, improving the parents' quality of sleep by helping the baby sleep through the night by developing healthy sleep habits. Newborns have fragmented sleep patterns in part base on their neurological development at this early age and therefore, newborns do not sleep for long periods of time. Infants also require two or three nighttime feedings since their tiny stomachs cannot hold enough food to keep them full for long periods.

There are a vast number of different techniques that have been publicized for training the baby to fall to sleep fast and at an early age. One of the most popular techniques is the Ferber method (named for its creator, Richard Ferber, M.D. This method is based on the notion that babies make associations with falling asleep, whether at bedtime or after waking in the middle of the night. Thus, if a parent routinely rocks the baby to sleep or allows the baby to fall asleep while having a bottle, the baby will come to rely on these things in order to go to sleep and will want them repeated when the baby awakes in the middle of the night. The baby thus has to be taught to learn to fall asleep by himself/herself in the crib. The Ferber method is designed to provide such instruction.

The Ferber method works in the following manner. The baby is placed in his/her baby in the crib, say good night, and leave the room. If the baby starts to cry, let the baby cry for a first period of time, say 5 minutes. Then go into the room, comfort the baby briefly without picking the baby up and then leave. If the baby cries, wait a second longer period of time, say 10 minutes before going in, then a third period of time (say 15 minutes), until the baby falls asleep. The point of going into the baby's room is reassure the baby that the parent still exists and to reassure the parent than the baby is okay. This ritual is then repeated with the same timed intervals used at the baby's bedtime each time the baby wakes up during the night.

Each subsequent night, an additional 5 minutes is added to the first interval. For example, the second night, start by waiting 10 minutes before going in and then on the third night wait for 15 minutes, etc. Many parents find that if the Ferber method is strictly adhered to that over the course of three to seven days, the baby learns to associate being in the crib with falling asleep. Also of importance is that the baby also learns that crying will not get his or her parents to pick him or her up.

There are a number of drawbacks that make this method difficult for parents and in particular, the Ferber method is not for the fainthearted since the parent has to be able to hear the baby's crying for an extended period of time.

Given the popularity of the Ferber method, it would therefore be desirable to provide an accessory that can be used with the Ferber method and increases the likelihood that the parent will adhere to the Ferber method until success is achieved.

SUMMARY

According to one embodiment, a noise suppressor for use with a crib includes a frame that is configured for being detachably coupled to a frame of the crib. The frame of the noise suppressor is configured to extend across an open top of the crib. The noise suppressor includes a noise suppressor structure that is coupled to the frame of the noise suppressor. The noise suppressor structure is configured to at least substantially extend across the open top of the crib and is formed of a noise suppressing material. The noise suppressor further includes electronics disposed along one of the frame of the noise suppressor and the noise suppressor structure. The electronics include a speaker, a timer, and a first sensor for sensing sound within the crib above a predetermined threshold. In one variation, the electronics is configured to play a recording when either a predetermined amount of time has lapsed or the sound above the predetermined threshold is observed.

BRIEF DESCRIPTION OF THE DRAWING FIGURES

DETAILED DESCRIPTION OF CERTAIN EMBODIMENTS

Figure 1:
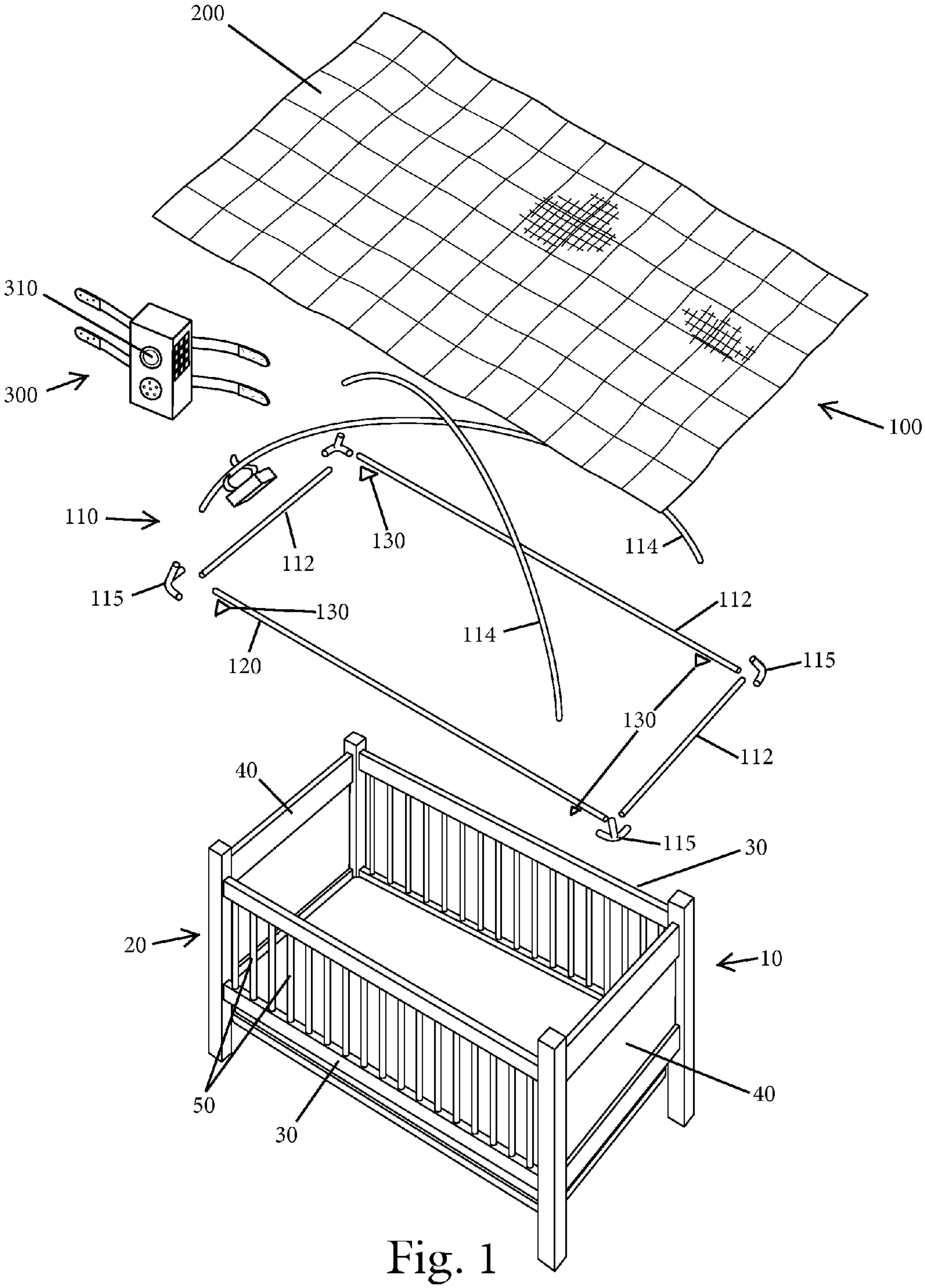
FIG. 1 is an exploded perspective view of a noise suppression system for use with a crib.

FIGS. 1-11 illustrate sleep aid accessories in the form of crib mountable noise suppressors 100, 400. With reference to FIGS. 1-4 which show one embodiment, the noise suppressor 100 is configured to be used with a crib 10 as an accessory to reduce noise (i.e., crying) that originates from the crib 10 and more specifically, the noise suppressor 100 can be used as an accessory for use when parents are trying to train their baby to sleep through the entire night.

The noise suppressor 100 can be thought of a device (product) that can be securely attached to a conventional crib 10 and is configured to suppress the sound of a baby within the crib 10. The noise suppressor 100 thus has particular utility when the parents are undergoing the Ferber method and must endure the heartbreaking task of listing to one's cry and scream for a lengthy period of time. As mentioned herein, the hardest part of the Ferber method is to hear one's baby cry and be unable to comfort the child since such comforting would defeat the purpose of the Ferber method. The noise suppressor 100 can thus be thought of as being an aid or accessory that has particularly utility for use in methods, such as the Ferber method, for training a baby to sleep through the night.

The conventional crib 10 has a frame 20 that generally includes a pair of side walls 30 and a pair of end walls 40. The side walls 30 can be thought of as being side rails and the end walls 40 are generally thought of as being a headboard and a footboard. The frame 20 also typically includes a spring frame on which a mattress is supported. While in some cribs, one or more of the end walls can be solid, the side walls 30 are typically open and formed by a plurality of spaced slats 50. The spacing between the slats 50 is governed by regulation and in particular, the spacing is selected so that no health risk is involved to the baby (i.e., the spacing is too small for the baby's head to fit through, etc.).

The noise suppressor 100 is thus in the form of a physical structure which is detachably coupled to the crib frame 20 and is designed to suppress noise generated within the crib, in this case the crying of the baby. The noise suppressor 100 is thus a tent-like structure or the like that attaches to the top of the crib frame 20 for covering the open top of the crib. By covering the open top of the crib frame 20, the material of the noise suppressor structure absorbs the sound (cries, etc.) of the infant or otherwise deflects and/or dampens the noise.

In one variation, the noise suppressor 100 is configured to be detachably connected to the frame 20 of the crib 10. The noise suppressor 100 can be configured, at least in one variation, to be a tent-like structure that has a dome shape that extends across the open top of the crib 10. The noise suppressor 100 preferably does not extend downwardly along the sides of the crib frame, thereby allowing free air flow through the sides of the crib.

The noise suppressor 100 can include a frame 110 that is configured to attach to the frame 20 of the crib 10 and includes a sound proofing structure 200 that is associated with the frame 110 and serves to suppress noise that originates within the crib 10 such as the cries of an infant.

The frame 110 can be formed of a number of support members 120 such as tubular structures that can be connected to one another using connectors 115 to form the frame 110. The frame 110 is designed to mate with the frame 20 of the crib 10 and more particularly, is designed to be attached to an upper portion of the frame 20 of the crib 10. The frame 110 is thus supported by the frame 20 of the crib 10. The frame 110 includes means for detachably connecting the frame 110 to the frame 20 in a detachable manner. For example, the frame 110 can include a plurality of fasteners 130 that are configured to attach the frame 110 to the frame 20. The fasteners 130 can be in the form of any number of different types of fasteners that are suitable for the intended application. For example, the fasteners 130 can be in the form of clamps or the like that attach to the frame 20 of the crib 20. Any number of different clamps can be used (e.g., a clamp made up of two biased jaw members); however, the clamps are preferably configured to attach to many different types of crib frames 20 since there are many different crib designs on the market. For example, crib frames 20 typically have upper horizontal frame members that extend along a plurality of the sides of the crib and these upper horizontal frame members can have different dimensions from one crib 10 to another crib 10. Some upper horizontal frame members are wider than other and some have curved surfaces as opposed to flat surfaces. Thus, the fasteners (e.g., clamps) should be configured to attach to these different types of frame members and in particular, should be adjustable such that a secure attachment can be achieved between the frame 110 and the frame 20 of the crib 10.

It will therefore be understood that the illustrated frame 110 and fasteners 130 are merely exemplary in nature and not limiting of the types of frames and fasteners that can be used in the practice of the present invention.

The support members 120 of the frame 110 are configured to suspend the sound proofing structure 200 above the open top of the crib 10 so as to not interfere with normal movements of the infant within the crib 10. In other words, the sound proofing structure 200 is elevated such that it extends above the frame 20 of the crib 10.

In the illustrated embodiment and according to one variation of the present invention, the sound proofing structure 200 does not extend below the upper horizontal frame members of the frame 20 of the crib 10 and thus, air can freely flow into the crib 10 through the open spaces between the slats that traditionally define the sides of the crib frame 20. The sound proofing structure 200 can thus be thought of as being a canopy or tent-like structure that extends across the open top of the crib 10.

The sound proofing structure 200 is preferably designed and configured such that it dampens sound that originates in the crib interior. In other words, not only is the material of the structure 200 designed to dampen and absorb sound but also the contour of the structure 200 is also designed to dampen sound.

The frame 110 can be a cage-like structure that the support members 120 includes not only lower frame members 112 that mate with the upper horizontal frame members of the crib frame 20 but also can include arched (curved/arcuate) upper frame members 114 that extend upwardly from the lower frame members 112 and extend across the open top of the crib 10.

In one variation, the upper frame members 114 are separate from the sound proofing structure 200 and in combination with lower frame members 112 define frame 110. In this design construction, the frame 110 can be first constructed and attached to the frame 20 of the crib 10 before the sound proofing structure 200 is coupled to the frame 110. In an alternative variation, the upper frame members 114 are integral to the sound proofing structure 200 and in this variation, the complete frame 110 is not constructed first but instead the sound proofing structure 200 is attached to the lower frame members 112 which themselves are fastened to the frame 20 of the crib 10. The upper frame members 114 can thus be in the form of curved support members that are integral to the sound proofing structure 200 in that the upper frame member 114 can be disposed internally within the sound proofing structure or can be routed and disposed along one side of the sound proofing structure 200. Portions, such as end portions, of the upper frame members 114 can extend beyond the peripheral edges of the sound proofing structure 200 to provide attachment points for attaching the sound proofing structure 200 to the lower frame members 112. Any number of different techniques can be used to attach the upper frame members 114 to the lower frame members 112 in a releasable manner, such as a snap-fit or by the use of fasteners, etc. In addition, a quick-connect type structure can be employed to allow for the easy and quick attachment and detachment of the various members that form the assembled device.

The sound proofing structure 200 can thus be in the form of a flexible (pliable) blanket-like structure that has attachment points that allow the sound proofing structure 200 to be attached to the frame 110. As mentioned herein, fasteners can be used to attach the sound proofing structure 200 to the frame 110. For example, hook and loop material can be used to attach the sound proofing structure 200 to the frame 110. The sound proofing structure 200 can thus take the form of a rectangular structure that is mated to the frame 110.

As mentioned herein, any number of suitable sound proofing materials can be used.

It will also be appreciated that the sound proofing structure 200 can be formed of multiple arts that are coupled to one another to form the complete sound proofing structure 200. For example, the sound proofing structure 200 can be in the form of a number of individual panels that are coupled to one another to form the assembled sound proofing structure. Any number of different techniques can be used to couple the individual panels to one another including but not limited to the use of fasteners—such as different types of mechanical fasteners including but not limited to hook and loop type fasteners. In this embodiment, once the sound proofing structure is assembled, it is then mated to the frame 110 using traditional techniques, including those disclosed herein.

It will be appreciated that any of the sound proofing structures 200 described herein can include decorative indicia, such as a playful print, etc. or a pattern or other graphic content.

The noise suppressor 100 can also include a number of features that can be used to supplement the sleep training method that has been chosen and implemented by the parents. For example, the noise suppressor 100 can include integral electronics 300 and a speaker 310 that can be used to emit sound (e.g., preprogrammed sounds). For example, the electronics 300 can include a timer 305 that that can be initiated and stopped by user input (commands entered remotely or via an input device 307 (keyboard or pad, etc.). The timer 305 is also programmable so that the user can program in the sleep training schedule. For example, the timer program can feature consecutive day numbers and for each day number, the user enters a period of time, such as 5 minutes for day 1; 10 minutes for day 2, etc. This is in accordance to the teachings of the sleep training method (e.g., the Ferber method) being implemented. The timer 305 can also include a display (e.g. LCD display).

The system can be configured such that once the preprogrammed period of time passes, say 5 minutes, the processor instructs a prerecorded track to be played over the speaker 310. This prerecorded track can be made by the parents and include comforting words from the parents or can be music.

In addition, the system can be configured to sense the level of noise in the crib 10 and in the event that the sensed noise exceeds a certain threshold (decibel threshold), the prerecorded track can be played. Alternatively, if a level of noise is sensed for a threshold amount of time, the prerecorded track can be played. Thus, in both these situations, the prerecorded track is played in an effort to sooth and pacify the baby without parent involvement. The decibel threshold thus detects loud crying and the threshold amount of time is set so that it is a period of extended crying, such as 2 minutes or more. If there is a stoppage in the crying, the timer program can be configured to react differently depending upon how long the stoppage was. For example, for short stoppages (20 seconds or less), the timer will count such stoppages as part of the sensed crying event, while if there are longer stoppages, such 1 minute or more, the timer program will reset. To accomplish the foregoing, a sound sensor can be used.

The sound sensor can be incorporated into the sound proof structure 200.

The electronics 300 further include one or more sensors 320 that are configured to detect excessive movement of the noise suppressor 100 relative to the stationary crib 10. More specifically, the sensor 320 can be in the form of one or more motion sensors that detect movement of the article to which they are attached (in this case the sound proofing structure 200). Excessive movement of the sound proofing structure 200 is not desired and can signal an undesirable event, such as a shift in position of the sound proofing structure 200 which can signal the collapse or partial collapse of the sound proofing structure 200.

Figure 4:
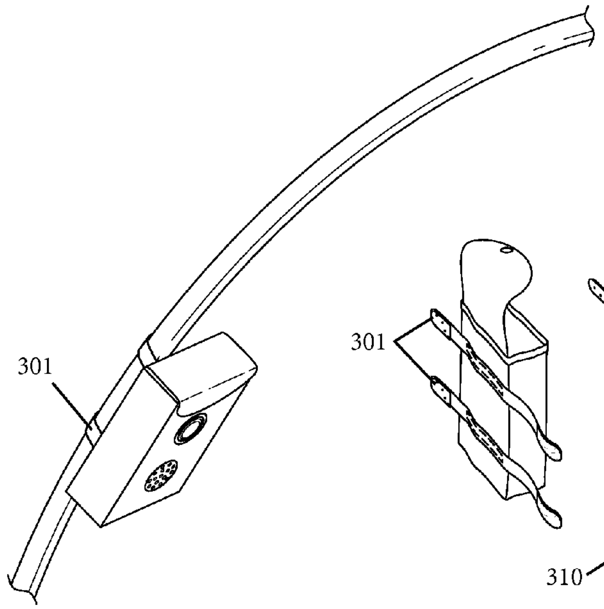
FIG. 4 is a perspective view of one end of a frame member showing attachment of the electronics.
Figure 3:
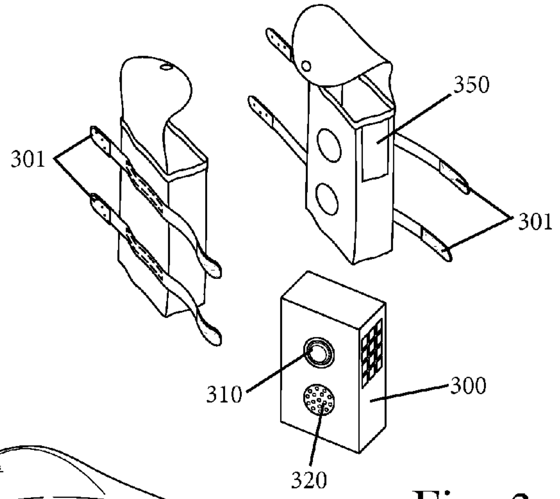
FIG. 3 is a series of perspective views showing exemplary electronics of the noise suppression system.
Figure 2:
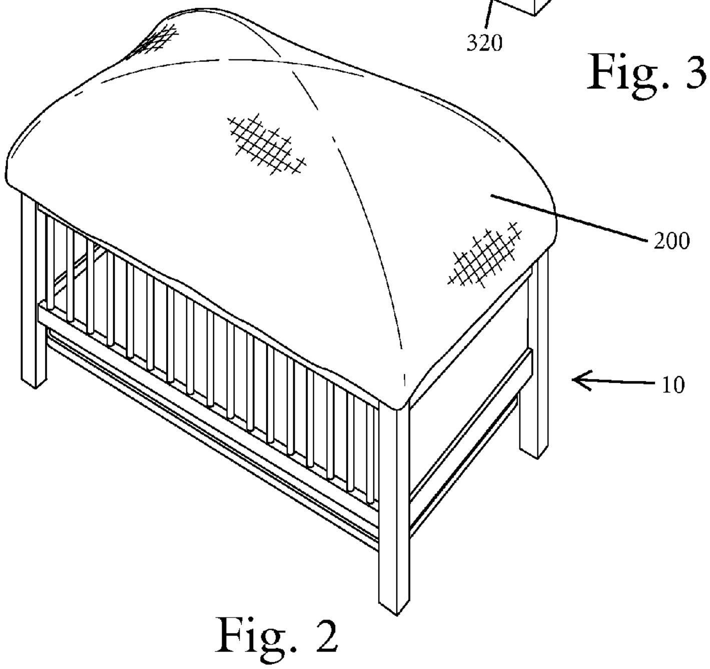
FIG. 2 is a perspective view of the noise suppression system coupled to the crib.
Figure 5:
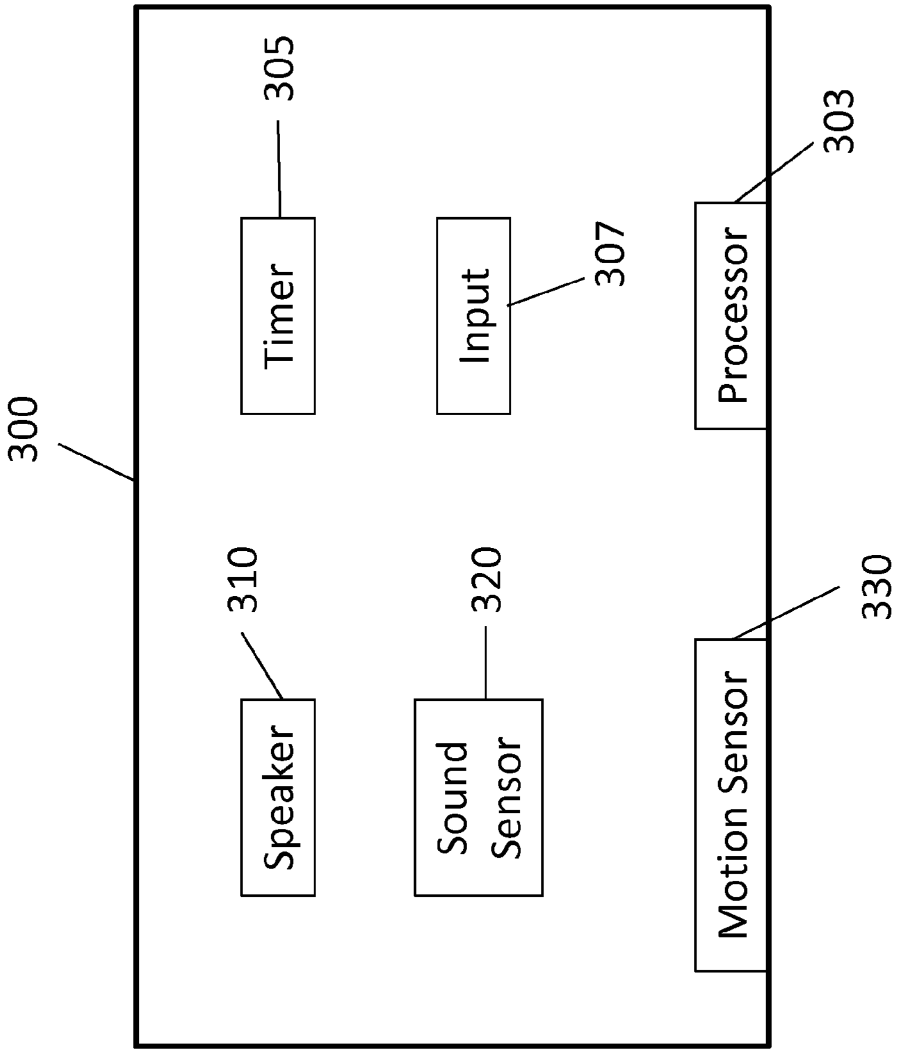
FIG. 5 is a schematic of exemplary electronics for use in the system of FIG. 1.
Figure 6:
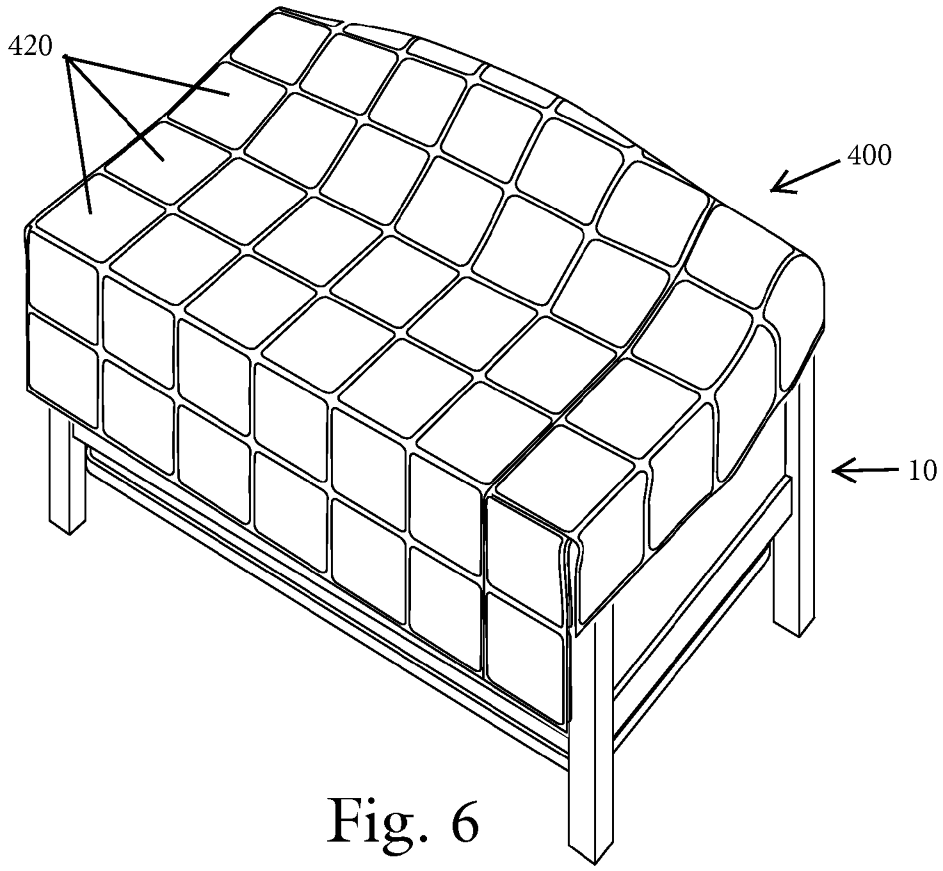
FIG. 6 is a perspective view of another noise suppression system coupled to a crib.
Figure 7:
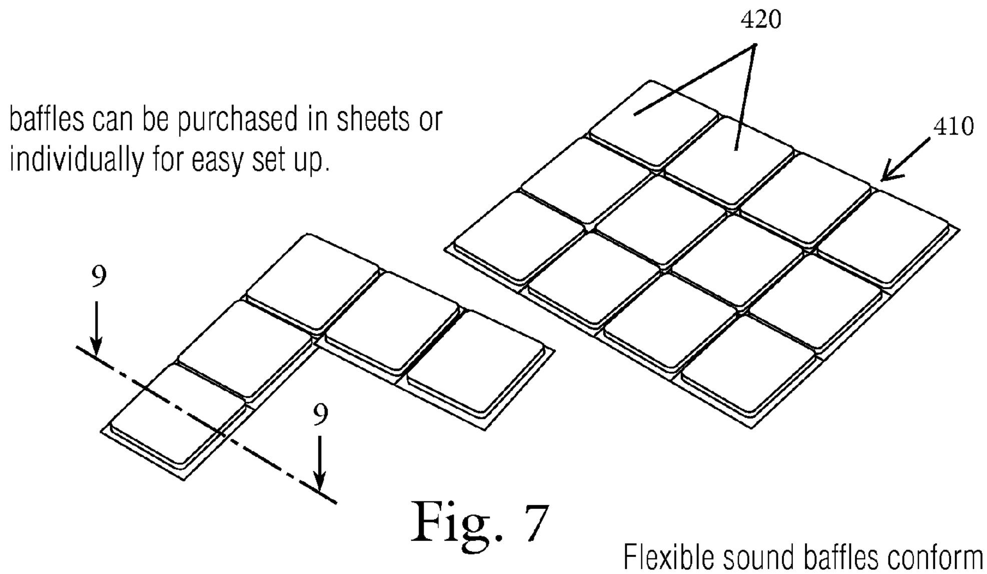
FIG. 7 is a perspective view of a plurality of panels (baffles) for combination to form a noise suppressor structure.

It will be appreciated that the electronics 300, including the sensors mentioned herein, are incorporated into one of the sound proof structure 200 and the frame 110. FIGS. 3-4 show the electronics 300 being attached to one of the upper frame support members 114 using fasteners 301. The electronics can be disposed in a holder 350 that includes fasteners 301 for attaching the electronics 300 (which are received within a hollow interior of the holder 350) to the support 114. The attachment of the electronics 300 to the support member 114 positions the electronics proximate the crib but out of reach of the infant. It will be understood that the electronics 300 and/or any part thereof can be disposed integrally within one of the parts of the system 100. For example, the electronics 300 can be integrally formed within the support member 114 or member 112.

For example, the electronics 300 includes a processor 303 that is operatively coupled to a user interface (input 307). The user interface 307 allows for user to input information such as the timer program information and also music programming information, such as a playlist. The processor 205 executes code (software). The electronics 300 are powered using conventional means including the use of a battery or an electrical outlet.

The noise suppressor 100 is also designed to include a number of safety measures to ensure that the noise suppressor 100 remains properly situated relative to the crib 10.

In addition, the electronics 300 include a second sensor 330 that is a motion sensor that is configured to detect motion above a threshold amount. The second sensor 330 is intended to monitor for movement of the noise suppressor 100 and alert the parent as to any unwanted motion of the noise suppressor 100. For example, if excessive movement of the noise suppressor 100 is sensed, the parent can be alerted and then take appropriate remedial actions, such as at least investigating the situation by going into the room that contains the crib.

The second sensor 330 is in communication with the processor 303 and thus, signals from the second sensor 330 are delivered to the processor 303 for processing and then additional actions can be taken such as generating an alert under prescribed conditions. For example, if excessive motion is detected by sensor 330, an alert can be generated, such as auditory alert emitted through speaker 310. In addition, the alert can be sent to a remote device, such as a mobile device (e.g., smartphone) of the patent (e.g., a message can be sent along with an auditory warning).

FIGS. 6-11 show a modular, customizable sound proofing structure 400. The sound proofing structure 400 can be provided in sheets 410 as shown. The sheets 410 can be formed of a series of individual discrete elements (panels) 420 that are used to construct a sound proofing structure 400 that has a desired shape. The elements 420 can be formed such that they can be easily separated from one another. For example, the elements 420 can be formed such that they include rupturable seams (perforated edges) that permit the individual elements 420 to be broken apart. In this manner, the user can customize the shape of the sound proofing structure 400 by removing selected elements 420 and/or by attaching selected elements 420 in a certain manner.

In the illustrated embodiment, the elements 420 are square shaped; however, this is merely one exemplary shape and it will be appreciated that the elements 420 can take any number of other shapes. The elements 420 can have any number of different stiffness characteristics to allow the elements 420 to be positioned across the frame and to extend across the crib as discussed herein.

Figure 9:
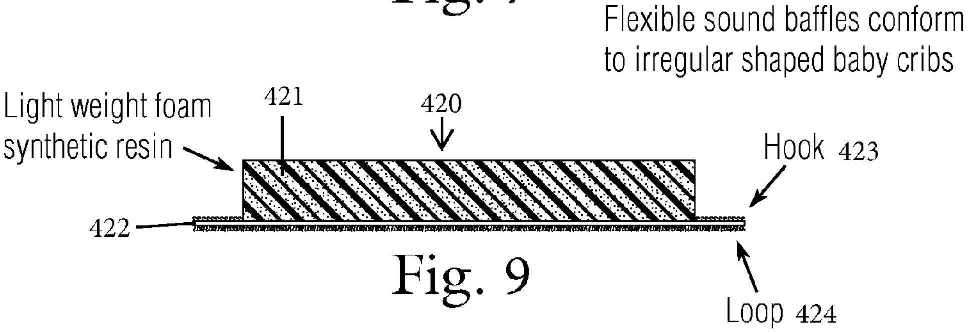
FIG. 9 is a cross-sectional view taken along the line 9-9 of FIG. 7.

FIG. 9 shows one exemplary panel 420 that has a main section 421 with sound dampening material (foam material) and a perimeter section 422 that extends therefrom. The perimeter section 422 carries a fastener which in this case is hook material 423 on one surface (top surface) and a loop material 424 on another surface (bottom surface). The hook and loop material 423, 424 serves as a means for mating with the hook and loop material 423, 424 of an adjacent panel to attach the two panels 420.

Figure 8:
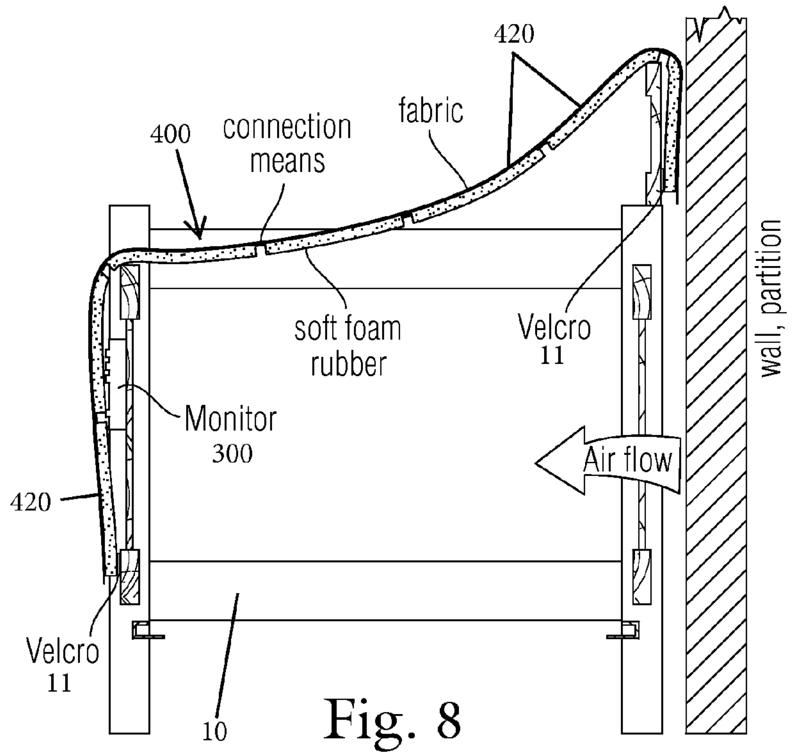
FIG. 8 is a cross-sectional view of the panel installed on the crib.

FIG. 8 shows attached of the noise suppressor 400 to the crib 10 in which the crib 10 has fasteners 11 which mate with the fastener 423, 424 of the panel 420 to cause the noise suppressor 400 to be detachably connected to the crib 10.

Figure 11:
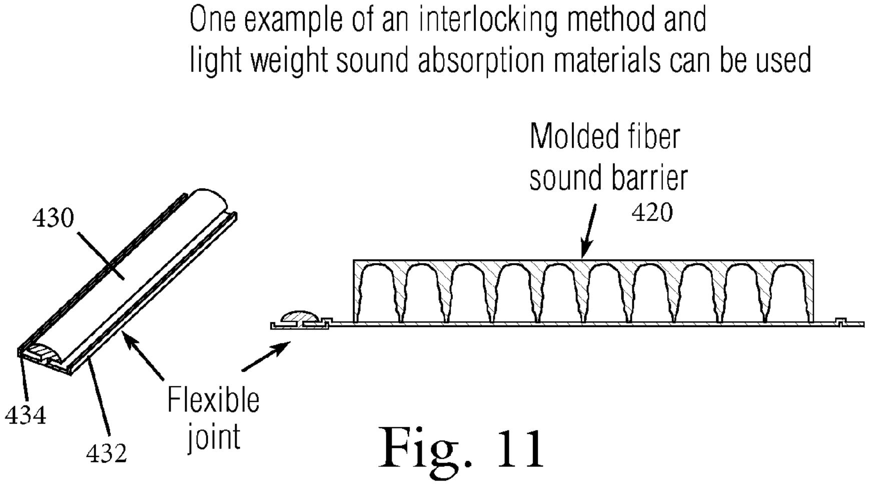
FIG. 11 shows one panel in cross-section and a connector for attaching plural panels.

FIG. 11 shows one exemplary connector 430 that is configured to connect two or more elements 420. The connector 430 can be in the form of an elongated structure that has a first edge 432 and an opposing second edge 434. The first and second edges 432, 434 can be configured to include a slot or the like for receiving one edge of the panel (element) 420 for attaching the panel 420 to the connector 430 in a secure manner. For example, a frictional fit can be formed between the panel 420 and the connector 430. The connector 430 can be formed of a pliable (flexible) material, such as rubber or plastic, to define a flexible joint between the panels 420. This allows the sound proofing structure 400 to be bended in places to fit to the frame of the sound proofing structure.

In addition to a frictional fit, the connectors 430 can includes fasteners or the like, to further secure the panels 420 to the connector 430. For example, a screw can be inserted through the connector 430 and into contact with the panel 420 to attach the panel 420 to the connector 430.

In an embodiment in which the elements 420 are rigid, the connectors 430 can be formed to allow for flexibility of the final assembled structure so as to allow the assembled sound proofing structure to be disposed along and coupled to the frame of the sound proofing structure.

As shown in the cross-sectional view of FIG. 11, the panel 420 can be a molded fiber sound barrier that includes air spaces between top and bottom surfaces of the panel 420. This construction provides sound dampening.

Figure 10:
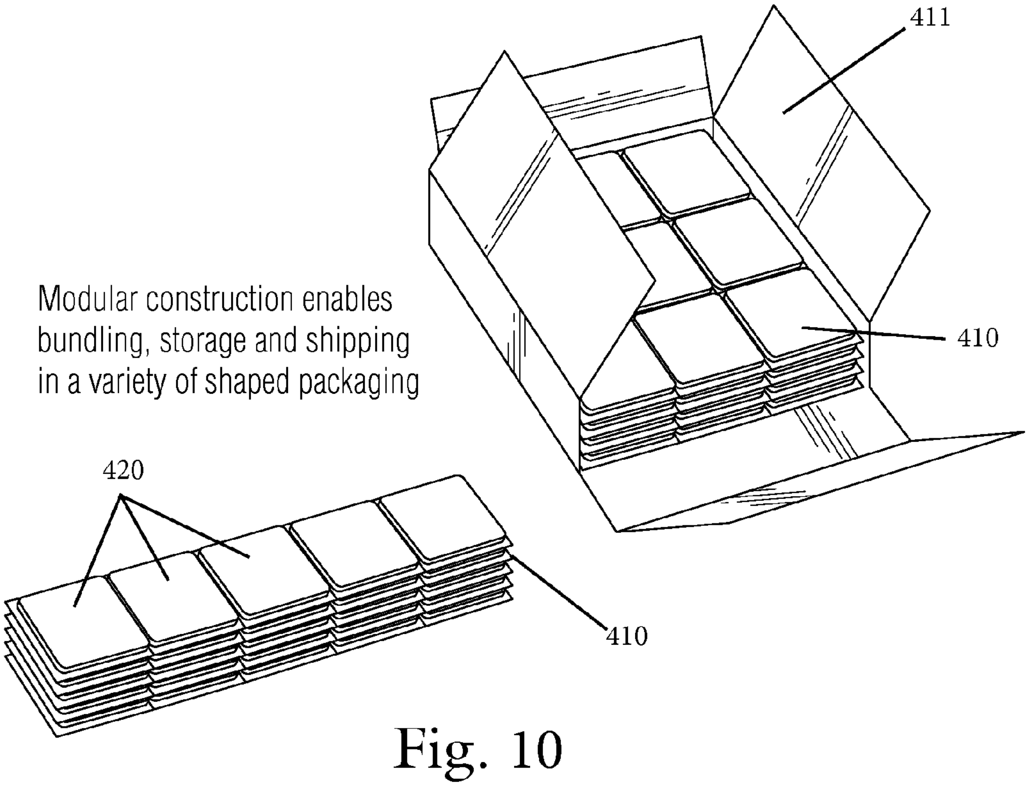
FIG. 10 is a view of packaging (box) including the panels.

The panels 420 can be provided in sheets 410 which can be packaged using any number of different types of packaging 411 as shown in FIG. 10 and more specifically, the sheets 410 can be packaged in a box or the like as shown.

It will also be appreciated that part of the electronics 300, such as one or more of the first and second sensors, can be integral to the frame of the noise suppressor and be connected to other parts of the electronics, as by an electrical connection (cable, etc.). Thus, the motion sensor for example can be disposed in the frame and electrically connected as by cable or wireless communication to the rest of the electronics including the processor, etc.

What is claimed is:

1. A noise suppressor for use with a crib that has a frame separate from the noise suppressor comprising:

a frame that is configured for being detachably coupled to the frame of the crib, the frame of the noise suppressor being configured to extend across an open top of the crib that is defined by side rails and end walls, wherein the frame of the noise suppressor is configured such that at least a portion thereof is positioned for suspension above an inner portion of a mattress support structure of the frame of the crib;

a noise suppressor structure that is formed of a noise suppressing material and is coupled to the frame of the noise suppressor, the noise suppressor structure being configured to at least substantially extend across the open top of the crib across the mattress support structure and is formed of a noise suppressing material; and electronics disposed along one of the frame of the noise suppressor and the noise suppressor structure, the electronics including a speaker, a timer, and a first sensor for sensing sound within the crib above a predetermined threshold, the electronics being configured to play a recording when either a predetermined amount of time has lapsed or the sound above the predetermined threshold is observed;

wherein the noise suppressor is formed as a standalone unit separate from the crib.

2. The noise suppressor of claim 1, wherein the frame of the noise suppressor includes connectors for detachable coupling to rails of the frame of the crib and includes at least one transverse member that extends above and across the open top of the crib.

3. The noise suppressor of claim 2, wherein the connectors comprise clamp members for attachment to the rails of the frame of the crib.

4. The noise suppressor of claim 1, wherein the frame of the noise suppressor has a dome shape.

5. The noise suppressor of claim 2, wherein the frame includes a pair of transverse members that comprises arcuate shaped members that cross one another at at least one location.

6. The noise suppressor of claim 5, wherein the frame includes a base section that has a generally rectangular shape that is complementary to the frame of the crib and seats adjacent the frame of the crib, wherein the arcuate shape members connect at their ends to the base section.

7. The noise suppressor of claim 1, wherein the noise suppressor structure comprises a flexible structure that is supported by the frame of the noise suppressor, the noise suppressor structure covering the open top of the crib, while leaving sides of the crib at least substantially open to permit air flow into the crib.

8. The noise suppressor of claim 7, wherein the noise suppressor structure is formed of a plurality of panels that are coupled to one another to form the complete noise suppressor structure.

9. The noise suppressor of claim 8, wherein each panel is detachably connected to one or more other panels.

10. The noise suppressor of claim 1, wherein electronics are disposed within a single unit that is detachably connected to one of the frame and the noise suppressor structure.

11. The noise suppressor of claim 1, wherein the recording comprises music.

12. The noise suppressor of claim 1, wherein the first sensor comprises a sound sensor.

13. The noise suppressor of claim 1, further including a second sensor which is configured to sense movement of at least one of the frame and the noise suppressor structure and the electronics comprise an alert device that is in communication with the second sensor such that under predetermined conditions, the second sensor sends a signal to the alert device for activation thereof.

14. The noise suppressor of claim 13, wherein the alert device emits at one of an audio alert and a visual alert.

15. The noise suppressor of claim 13, wherein the alert device is coupled to one of the frame and the noise suppressor structure.

16. The noise suppressor of claim 13, wherein the alert device comprises a mobile device that is separate and remote from both the frame and the noise suppressor structure.

17. The noise suppressor of claim 16, wherein the mobile device comprises a smart phone.

18. The noise suppressor of claim 1, wherein the noise suppressor structure comprises a flexible structure that is supported by the frame of the noise suppressor, the noise suppressor structure being detachably coupled to the frame of the noise suppressor at a plurality of spaced points.

19. The noise suppressor of claim 18, wherein a plurality of fasteners detachably couple the noise suppressor structure to the frame of the noise suppressor.

20. The noise suppressor of claim 19, wherein the fasteners comprise hook and loop fasteners.

21. A noise suppressor for use with a crib that has a frame separate from the noise suppressor comprising:

a frame that is configured for being detachably coupled to the frame of the crib, the frame of the noise suppressor being configured to extend across an open top of the crib;

a noise suppressor structure that is formed of a noise suppressing material and is coupled to the frame of the noise suppressor, the noise suppressor structure being configured to at least substantially extend across the open top of the crib and is formed of a noise suppressing material; and electronics disposed along one of the frame of the noise suppressor and the noise suppressor structure the electronics including a speaker a timer and a first sensor for sensing sound within the crib above a predetermined threshold, the electronics being configured to play a recording when a predetermined amount of time has lapsed after the first sensor senses sound above the predetermined threshold;

wherein the electronics include a program in which the predetermined amount of time increases successively for subsequent days.

22. A noise suppressor for use with a crib that has a frame separate from the noise suppressor comprising:

a frame that is configured for being detachably coupled to the frame of the crib, the frame of the noise suppressor being configured to extend across an open top of the crib that is defined by side rails and end walls, wherein the frame of the noise suppressor is configured such that at least a portion thereof is positioned for suspension above an inner portion of a mattress support structure of the frame of the crib;

a noise suppressor structure that is coupled to the frame of the noise suppressor, the noise suppressor structure being configured to at least substantially extend across the open top of the crib across the mattress support structure and is formed of a noise suppressing material; and electronics disposed along one of the frame of the noise suppressor and the noise suppressor structure, the electronics including a speaker, a timer, and a first sensor for sensing sound within the crib above a predetermined threshold, the electronics being configured to play a recording;

wherein the noise suppressor is formed as a standalone unit separate from the crib;

wherein the electronics are configured to play the recording when a level of noise above the predetermined threshold is sensed for a threshold amount of time by the first sensor.

* * * * *